Patented Feb. 10, 1953

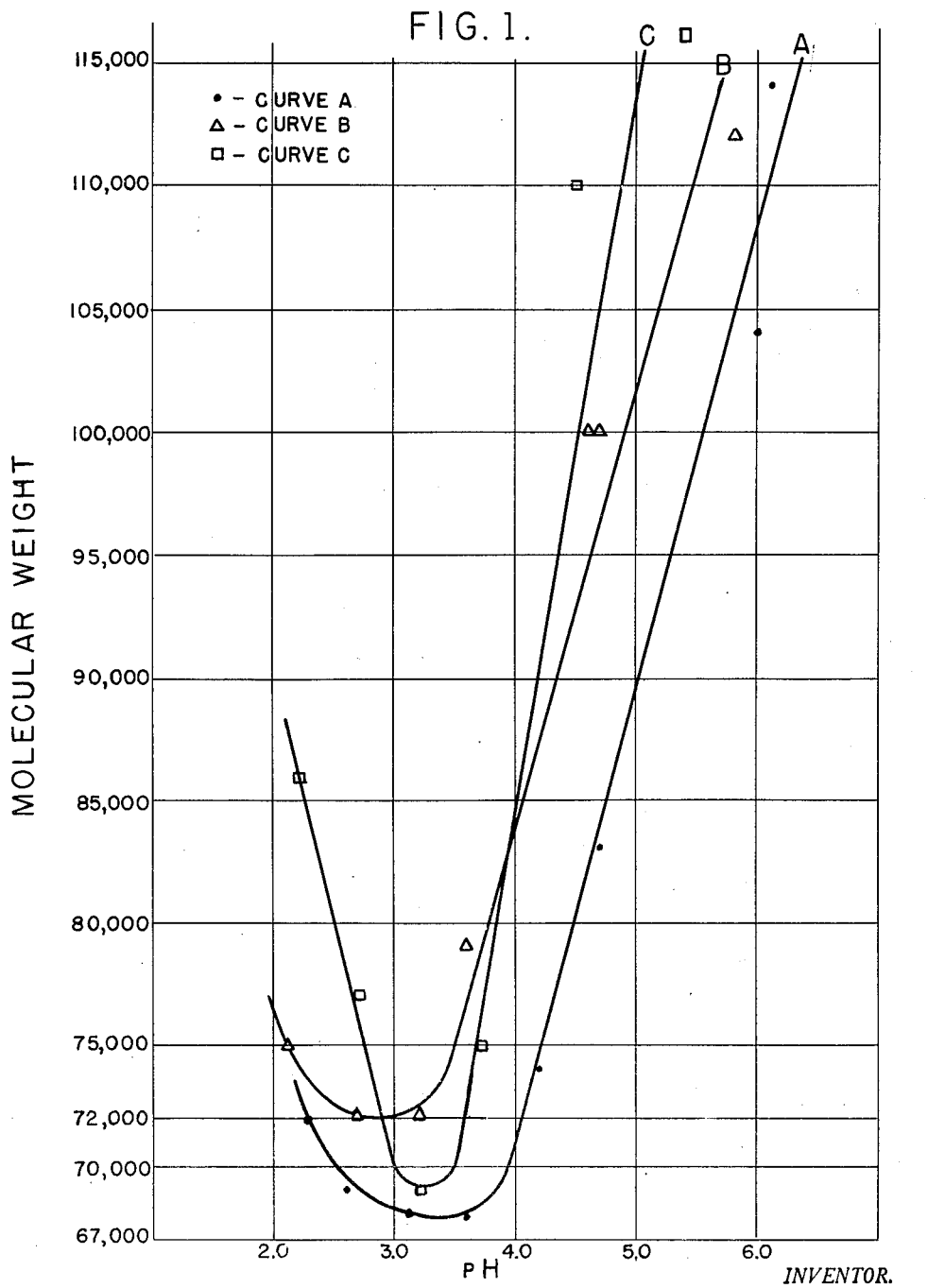

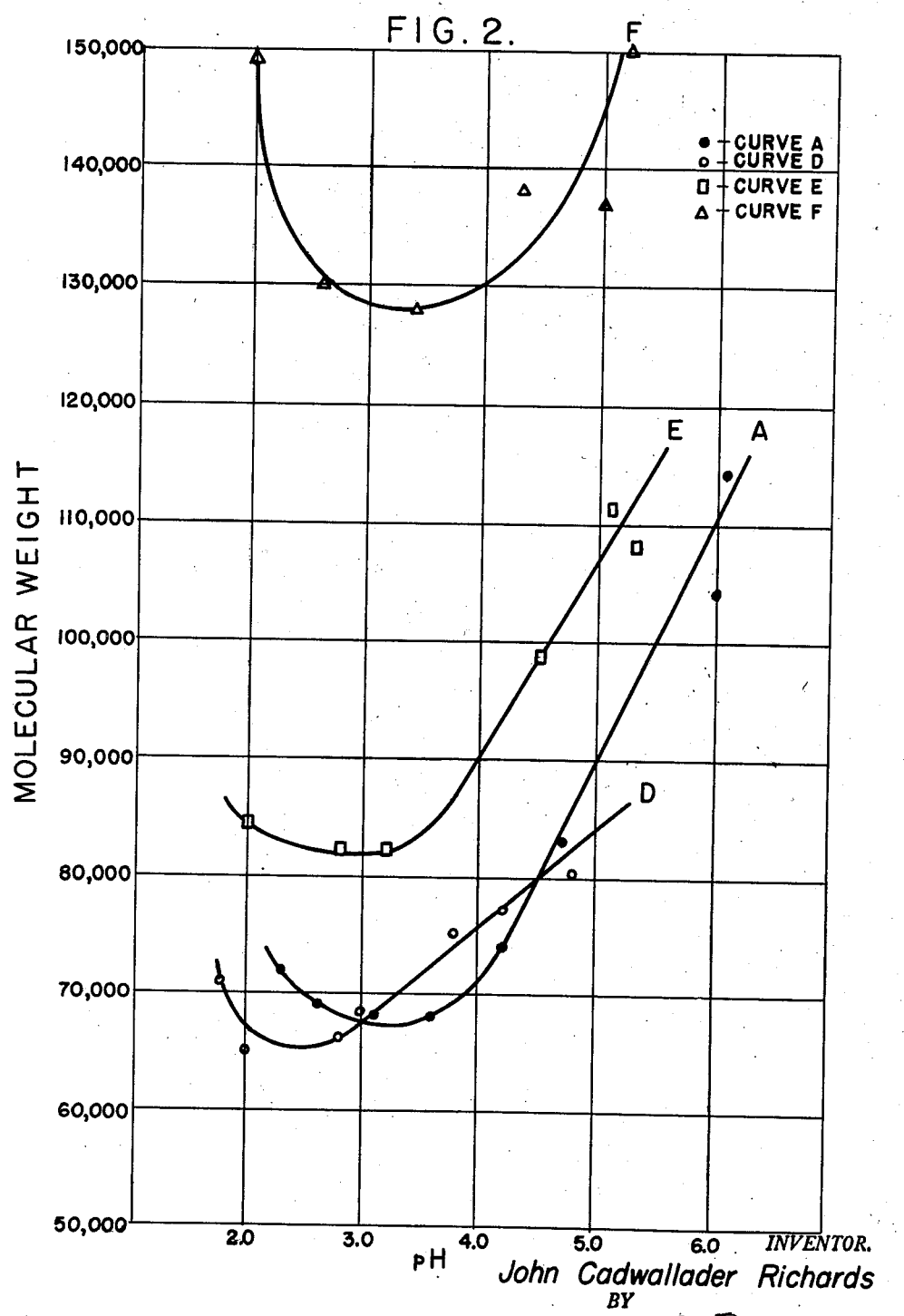

2,628,223

UNITED STATES PATENT OFFICE 2,628,223

POLYMERIZATION OF ACRYLONITRILE TO POLYMERS OF CONTROLLED MOLECULAR WEIGHT

John Cadwallader Richards, Urbana, Ill., assignor to E. I. du Pont de Nemours & Company, Wilmington, Del., a corporation of Delaware Application February 9, 1949, Serial No. 75,436

7 Claims. (Cl. 260—88.7)

This invention relates to the preparation of acrylonitrile polymer and, in particular, to a process for obtaining acrylonitrile polymer having uniform, predetermined average molecular weight.

Acrylonitrile polymers can be dissolved in certain volatile organic solvents, such as are disclosed in U. S. Patents 2,404,714–2,404,727, inclusive, to form solutions suitable for extrusion into shaped articles such as yarns. The yarns are moderately easy to prepare by standard wet- and dry-spinning techniques and they are eminently suited for use in the textile art. In fact, there is a great demand in the textile industry for a yarn having the outstanding properties, such as high tenacity, good outdoor durability, and the insolubility in, and insensitivity to common organic solvents, possessed by polyacrylonitrile yarns.

It is preferred to dry-spin solutions of polyacrylonitrile in dimethyl formamide for economic reasons. The spinnability of a polymer solution naturally depends upon the temperature and viscosity of the solutions and also upon the uniformity of the polymer from the standpoint of molecular weight distribution and structure. For good spinnability, a polymer should be substantially linear. Branching in the polymer chain affects the solution characteristics of the polymer and the way in which a concentrated solution of the polymer passes through a small orifice, as in a spinneret. Likewise, the size of the polymer molecules should be uniform, and should be predetermined to give a balance between good spinnability and maximum physical properties. A broad molecular weight distribution leads to difficult spinning and poor physical properties. For the dry-spinning of polyacrylonitrile yarns from solutions of the polymer in dimethyl formamide, for example, a polymer average molecular weight, as calculated from its specific viscosity and Staudinger constant, ranging from about 50,000 to 90,000 is necessary to give the proper balance between good spinnability and maximum physical properties. This preferred average molecular weight of 50,000–90,000 may be obtained by blending batches of polymer having molecular weights considerably higher and lower than these predetermined limits. However, if a fraction having an average molecular weight of 100,000 or greater is used in this blending procedure, the spinnability of the blend becomes progressively worse as the molecular weight of the fraction increases. In fact, blends averaging 80,000 in molecular weight and containing substantial fractions of polymer having a molecular weight of 184,000 could not be dry-spun even though the solutions were homogeneous to visual observation. Yet, to obtain yarns having maximum physical properties the average molecular weight of the acrylonitrile polymer should be at least 50,000.

It has been found that for ease of spinning, maximum uniformity in denier and in drawing continuity, polyacrylonitrile fibers should be spun from dimethyl formamide solutions having a narrow viscosity range. When the spinning solution viscosity is too high, continuous spinning is difficult and the resulting yarn has poor drawing continuity and physical properties. There results an excessive number of breaks in the subsequent drawing operation. On the other hand, if the spinning solution viscosity is too low, the spinning operation is hampered by the formation of loops in the spun yarn. From the standpoint of physical properties of the yarn it is advantageous to use high molecular weight polymer such as polymers having uniform molecular weights of 100,000 and higher. However, when using these high molecular weight polymers, the spinnability becomes poorer and the spinning solution concentration must be low in order that the viscosity be in the proper range for spinning. Regardless of the polymer molecular weight, when the solution concentration is less than 17%, the newly spun yarn is usually sticky and readily forms loops.

While these spinning solutions can be prepared from polymers having a molecular weight ranging from 50,000–90,000 by appropriately adjusting the solution concentration between 17 and 27%, reproducibility of spinning conditions and final yarn properties demand that the polymer molecular weight be as uniform as possible. For economy in plant operations, it is desirable that polymer solutions be made up continuously to the same concentration. In the case of dimethyl formamide solutions of polyacrylonitrile this requires that the polymer molecular weight must not vary as much as 5,000 from one lot to the next. Such control, in polymerizations, is exceedingly difficult and heretofore unaccomplished. The viscosity of a spinning solution at 125° C. is, for most or all solvents, very sensitive to relatively slight changes in molecular weight. For example, the viscosity of a 20% solution in dimethyl formamide at 125° C. of polyacrylonitrile having a molecular weight of 70,000 is 60 poises, while polyacrylonitrile having a molecular weight of 77,000 forms a 20% solution having a viscosity of 92 poises. That is, a 10% increase in molecular weight resulted in a 50% increase in the 20% solution viscosity. This result emphasizes the need for careful control of polymer molecular weight in order to produce spinning solutions having the same viscosity and solids content. While polymer having the preferred molecular weight for dry-spinning yarns can be prepared by proper blending of polymers of various molecular weights according to the restrictions set forth above, it is economically inefficient to maintain stock piles of polymer having different molecular weights as well as blending the polymers. Further, uncontrolled polymerizations usually lead to the formation of insoluble polymer particles which frequently cause difficulties in spinning.

The polymerization of acrylonitrile consistently to obtain a spinnable polymer is best carried out in aqueous solutions in continuous manner, employing a perdisulfate derivative as catalyst, activated by a sulfoxy reducing agent. Even in this process the molecular weight of the polymer varies sufficiently throughout the polymerization to require blending of the polymers before spinning. Accordingly, an object of this invention is to prepare polyacrylonitrile having a uniform molecular weight. A further object of this invention is the continuous production of polyacrylonitrile having an average molecular weight of between 50,000 and 90,000. A still further object is to produce polyacrylonitrile in a continuous manner having an average molecular weight of between 62,000 and 67,000. Still another object of the invention is to produce polyacrylonitrile of such uniformity of molecular weight that blending prior to spinning is not necessary. Other objects will appear hereinafter.

The objects of this invention are accomplished by polymerizing acrylonitrile in an aqueous solution in the presence of a water-soluble perdisulfate derivative as catalyst in combination with a water-soluble sulfoxy-type reducing agent at a relatively constant acidity. The acidity is kept substantially constant during polymerization, preferably at a pH between 2.5 and 3.5. It has been found that the pH of the polymerization system has a profound effect on the molecular weight of the product obtained. This effect is shown in Figure 1, wherein pH is plotted against the average molecular weight of polymer products. It can be seen from this graph that the highest molecular weight products are obtained by maintaining the pH of the polymerization mixture as close to 6 as possible. Progressively lowering the pH leads to progressively lower molecular weight polymers. At a pH of about 3, a minimum is reached and progressively lower pH's result in progressively higher molecular weight products. Polymerization at about pH 3 allows the greatest flexibility and ease in controlling the pH of the reaction mixture throughout the polymerization. Obviously on a steep portion of the curve, the control of pH must be much more accurate in order consistently to produce polyacrylonitrile having a narrow average molecular weight range.

Since the molecular weight of a vinyl polymer usually depends, among other factors, upon the catalyst concentration and temperature conditions during polymerization, a vertical displacement along the molecular weight axis of curve A shown in Figure 1 is usually found when these factors are varied. If a higher catalyst concentration and/or higher temperature is used, the molecular weight at the various pH levels will be somewhat lower. The shape of the curve and the location of its minimum point will be the same as curve A in Figure 1. Likewise, the curve will be displaced to higher molecular weight regions if smaller amounts of catalyst and/or lower temperatures are used. Consequently, by proper manipulation of the catalyst and temperature conditions the minimum point of curve A shown in Figure 1 can be made to occur at practically any molecular weight. This flexibility of operation constitutes a great advantage in the practice of this invention.

This invention is illustrated by the following examples which are not limitative and in which parts and percentages are by weight.

EXAMPLE I

A reaction kettle charged with 1,870 parts of water was heated to 44° C. A constant pressure of nitrogen was maintained above the liquid level by allowing the gas to bubble slowly out of a water seal on an attached condenser. When the water reached 44° C., the following reactants were added:

120 parts acrylonitrile
0.6 part ammonium perdisulfate (0.5% based on the monomer)
1.2 parts sodium metabisulfite (1.0% based on the monomer)
and enough 2N sulfuric acid to bring the pH of the mixture to 3.2.

With constant mechanical agitation the reaction mixture became cloudy in 5–10 seconds. After 45 minutes of batch reaction, the various reactants were metered-in to the polymerizer at rates adjusted to keep the concentration of the reactants constant at the above ratios throughout the reaction. To maintain this ratio, the following continuous feed recipe was employed: 11.1% acrylonitrile (based on total weight), 0.5% ammonium perdisulfate and 1.0% sodium metabisulfite (both based on monomer weight) and enough sulfuric acid to maintain the desired pH of 3.2 and sufficient water to give 2,000 parts feed of reactants every 92 minutes. As the additional reactants were added to the kettle, the slurry of polymer in the kettle was allowed to overflow and was continuously filtered. Also, 70–100 parts of these samples of slurry were weighed and filtered. The collected polymer was washed with water and acetone, then dried at 30° C. and weighed to determine monomer conversion. The dried polymer thus obtained was used for molecular weight determination. Of 37 samples of slurry taken at four hour intervals, all were between 60,000 and 65,000 in molecular weight. Thirty-one or 84% of these were within 61,000 to 64,000.

EXAMPLE II

In a series of experiments carried out as described above in Example I but on a laboratory scale, the pH of the polymerization medium was varied. The replacement cycle for reactants was 80 minutes and the continuous polymerizations were carried out for periods of time ranging from 7½–11 hours. Slurry samples for molecular weight determination were taken more frequently, about one every hour and a half. The results are shown in Table I, and are the basis for curve A shown in Figure 1.

*Table I*

| pH | Mol. Wt. |
|---|---|
| 2.3 | 72,000 |
| 2.6 | 69,000 |
| 3.1 | 68,000 |
| 3.6 | 68,000 |
| 4.2 | 74,000 |
| 4.7 | 83,000 |
| 6.0 | 104,000 |
| 6.1 | 114,000 |

EXAMPLE III

The conditions of Example II were duplicated with the exception that trichloroacetic acid was used in place of sulfuric acid to adjust the pH of the reaction mixtures. In addition, the replacement cycle for reactants was 60 minutes instead of 80 minutes. The results of these experiments are listed in Table II and plotted as curve B in Figure 1.

*Table II*

| pH | Mol. Wt. |
|---|---|
| 2.1 | 75,000 |
| 2.7 | 72,000 |
| 3.2 | 72,000 |
| 3.6 | 79,000 |
| 4.0 | 100,000 |
| 4.7 | 100,000 |
| 5.8 | 112,000 |

EXAMPLE IV

Example III was duplicated in every respect with the exception that phosphoric acid was used in place of trichloroacetic acid to adjust the pH of the reaction mixture. The results of these experiments are listed in Table III and plotted as curve C in Figure 1.

*Table III*

| pH | Mol. Wt. |
|---|---|
| 2.2 | 86,000 |
| 2.7 | 77,000 |
| 3.2 | 69,000 |
| 3.7 | 75,000 |
| 4.5 | 110,000 |
| 5.4 | 116,000 |

Examples II, III and IV illustrate positively that, in the persulfate catalyzed polymerization of an aqueous solution of acrylonitrile, the molecular weight of the product formed is greatly dependent upon the pH of the polymerization mixture. This pH effect appears to be independent of the acid used. Figure 1 shows the use of various acids in controlling polymerization to give polymers having uniform molecular weights of the values indicated.

The effect of temperature on the pH-molecular weight relationship is shown in the following example.

EXAMPLE V

The series of experiments described in Example II was repeated at a temperature of 55° C., using a replacement cycle of 60 minutes. The results of these experiments are shown in Table IV and are plotted in Figure 2 as curve D. Curve A in Figure 2 is the same as that in Figure 1 and is shown for comparative purposes.

*Table IV*

| pH | Mol. Wt. |
|---|---|
| 1.8 | 71,000 |
| 2.0 | 65,000 |
| 2.8 | 66,000 |
| 3.0 | 68,000 |
| 3.8 | 75,000 |
| 4.2 | 77,000 |
| 4.8 | 80,000 |

It can be seen from Figure 2 that the shape of the curve is substantially the same as that for the experiments carried out at 44° C. In addition, the minimum point in the curve occurs in substantially the same pH range. As expected, the molecular weights of the polymer products are slightly lower for the 10° increase in reaction temperature.

EXAMPLE VI

This example illustrates the effect of catalyst concentration on the pH-molecular weight relationship. The experiments performed in Example V were repeated, using 0.35% ammonium persulfate and 0.70% sodium metabisulfite (both based on monomer) instead of the usual 0.5% and 1.0% respectively. This 30% reduction in catalyst and activator concentrations led to the formation of polymers having somewhat higher molecular weights. The results are shown in Table V and plotted as curve E in Figure 2.

*Table V*

| pH | Mol. Wt. |
|---|---|
| 2.0 | 84,000 |
| 2.8 | 82,000 |
| 3.2 | 82,000 |
| 4.5 | 99,000 |
| 5.1 | 111,000 |
| 5.3 | 108,000 |

In all of the examples previously described, the experiments were carried out using a catalyst to activator ratio of 1 to 2. It has also been found that in the polymerization of acrylonitrile, the ratio of catalyst to activator has a profound effect on the molecular weight of the products produced. However, the shape of the curve relating pH to molecular weight does not change appreciably and the minimum point of the curve again falls in the pH range 2.5–3.5. This is readily shown in the example which follows:

EXAMPLE VII

The series of experiments described in Example II was repeated, using one-fourth the amount of sodium metabisulfite called for in that example and a replacement cycle of 60 minutes. The results of these experiments are shown in Table VI and plotted as curve F in Figure 2. It can be readily seen from the data that an increase in the ratio of catalyst to activator results in a significant increase in polymer molecular weight.

*Table VI*

| pH | Mol. Wt. |
|---|---|
| 2.0 | 149,000 |
| 2.6 | 130,000 |
| 3.4 | 128,000 |
| 4.3 | 138,000 |
| 5.0 | 137,000 |
| 5.2 | 150,000 |

EXAMPLE VIII

A series of experiments carried out in the manner described in Example I under different conditions of catalyst, activator, temperature and pH, yielded the results listed in Table VII. In this table, the per cent catalyst and per cent activator are based on monomer.

*Table VII*

|   | Percent Cat. | Percent Act. | Temp., °C. | pH | Mol. Wt. |
|---|---|---|---|---|---|
| A | .50 | 1.0 | 45 | 3.1 | 68,000 |
| B | .35 | .70 | 45 | 3.2 | 82,000 |
| C | .50 | .25 | 45 | 3.4 | 128,000 |
| D | 1.2 | .20 | 60 | 3.2 | 68,000 |

A study of these results reveals that the various conditions of catalyst concentration, activator concentration, temperature and pH can be manipulated in any desired manner to produce polyacrylonitrile continuously and consistently having substantially any desired molecular weight. Since the general relationship between pH and molecular weight of polymer formed is substantially independent of these variables, proper manipulation of these variables will locate the minimum point of the curve relating pH to molecular weight at substantially any desired molecular weight. Comparing experiment C with experiment A in Table VII, it can be seen that a reduction in activator concentration results in a substantial increase in the molecular weight of the product. In experiment D, the ratio of catalyst to activator was again increased but the expected increase in molecular weight was counterbalanced by the use of more than double the amount of catalyst and operating at considerably higher temperature.

The average molecular weights described in this invention were obtained from viscosity data by using the equation:

Molecular weight = 32,700 × intrinsic viscosity

The molecular weights obtained in this fashion were found to compare very well with those calculated from the Staudinger equation. A statistical analysis of the viscosity data indicated that the intrinsic viscosities obtained were accurate to ±0.03 intrinsic viscosity units, which translated into molecular weight units means ±1,000. It can be seen, therefore, that the use of this invention results in extremely accurate control of polymer molecular weight. The necessity for this polymer uniformity has been demonstrated in the previous discussion.

The catalyst may be any water-soluble derivative of perdisulfuric acid; such as sodium, potassium, lithium, barium, magnesium, calcium and ammonium perdisulfate in conjunction with an activator. Polyacrylonitrile yarns having the best physical properties are spun from polymer prepared in the presence of an activator. By an activator is meant a reducing agent which apparently acts to speed up the decomposition of the perdisulfate catalyst into active polymerization initiators. The preferred compounds for activating the perdisulfate catalyst are the water-soluble, oxidizable sulfoxy compounds in which the valence of a sulfur atom does not exceed 4. Compounds of this type which can be used in this invention contain, then, a sulfur atom having a valance of plus 4 or less and include, among others, sodium bisulfite, sodium metabisulfite, sulfur dioxide, sodium hydrosulfite, sodium thiosulfate, diethylsulfite, formamidine sulfinic acid, and p-toluene sulfinic acid. Further, any material which in acidic media forms sulfur dioxide may be used in the process of this invention. The inorganic sulfoxy reducing agents are, in general, preferred. It is shown in Examples VI and VII that the concentration of the catalyst and activator has no appreciable effect on the general relationship between pH and molecular weight. Further as shown in Example VIII, the catalyst and activator concentrations may be varied within wide limits. In fact, as previously pointed out, the variation of catalyst and activator concentrations may be employed advantageously to locate the minimum point of the curve relating pH to molecular weight at any desired molecular weight. For the production of the preferred polymer for preparing polyacrylonitrile yarns by a dry-spinning process, the catalyst concentration should be between 0.3% and 0.75% and the activator concentration between 0.6% and 1.5%. The preferred concentrations are about 0.5% for the catalyst and about 1% for the activator (the figures being by weight based on the monomer) while operating at a temperature of 45° C.

The process of this invention is capable of being operated at a temperature of from 5° to 100° C. Preferred are room temperatures or slightly elevated temperatures, for example from 20°–75° C. Normally, the process is operated at a temperature of 45° C. The heat evolved by the polymerization reaction is sufficient to maintain this temperature and a minimum of temperature control is necessary.

The process is preferably operated under an atmosphere of an inert gas. The inert medium may be selected from a large number of materials including nitrogen, carbon dioxide, methane or helium. It usually is preferred to displace air with a gas such as nitrogen since greater control over the polymerization is attained. In fact, oxygen does interfere with the controlled polymerization and, for easier control, it is preferred to keep the oxygen content of the inert medium below 1%.

Likewise, the process is not limited to any particular apparatus. Suitable vessels include those constructed of aluminum, nickel, silver or lead. Vessels equipped with glass or enamel liners may also be used. Particularly advantageous are aluminum vessels, or vessels lined with aluminum, because the accumulation of polymer scale on the walls of the reactors is negligible at a pH of less than 4. There is, therefore, an added advantage in operating under the preferred acidity conditions of this invention, i. e. between a pH of from 2.5 to 3.5. When vessels other than aluminum are used and even with aluminum at a pH greater than 4, a considerable amount of polymer scale forms on the walls of the reactor. This polymer accumulation necessitates frequent shutdown for cleaning and thus has a substantial effect on the economics of polymer preparation.

In general, any acid, inorganic or organic, can be used, as a source of the hydrogen ions necessary to give the desired pH in the polymerization media.

Variation of the replacement cycle time has been found to have little effect on the properties of polymer at moderate conversions. Polyacrylonitrile prepared in accordance with this invention with a 28 minute cycle could not be distinguished from that prepared using a 92 minute cycle. Longer or shorter cycles may be used as desired.

Using the process of this invention, the conversion from acrylonitrile monomer to polymer is consistently under 85%. This is desirable because more linear polymer chains are produced. Undesirable chain branching is known to occur in vinyl polymerization, particularly when the conversion from monomer to polymer exceeds 85%.

In contrast to the uniform polymer prepared as described in Example I, wherein 84% of the polymer samples had an average molecular weight within 61,000–64,000, polyacrylonitrile prepared under the same conditions in the absence of pH control varies considerably in molecular weight. For example, when Example I was repeated while allowing the pH of the slurry to vary between 2.5 and 5.0, polyacrylonitrile having an average molecular weight of 62,000 was prepared. However, only 27% of the polymer samples taken had a molecular weight between 60,000 and 65,000. This polymer, having a much greater distribution of molecular weights, resulted in much poorer than normal spinning. In addition, yarn prepared from this polymer exhibited inferior drawing continuity in subsequent stretching operations and its physical properties were correspondingly non-uniform. Particularly noted was a loss of tensile strength and abrasion resistance.

The use of this invention is not limited to the polymerization of acrylonitrile alone. The principle involved is the same and, in fact, the shape of the curve relating pH to molecular weight is substantially the same when acrylonitrile is copolymerized with another vinyl monomer. In the copolymerization of acrylonitrile with 2-vinylpyridine, 5-ethyl-2-vinylpyridine, and again with 5-vinyl-2-methylpyridine, it was found that the curve relating pH to molecular weight was similar in shape to that for the homopolymerization of acrylonitrile and their minimum points occurred in the pH range of 2.5–3.5. The molecular weight of the copolymer product will vary with the specific vinyl monomer employed in the copolymerization with acrylonitrile. This variance, of course, is caused by the different relative reactivities of the vinyl group depending on the adjoining atoms.

The process of this invention can be used to prepare acrylonitrile polymers having substantially any desired molecular weight between 5,000 and 500,000. It is especially useful in preparing uniform polymers of acrylonitrile having a predetermined molecular weight in the range of 50,000–150,000. A process has been described for the preparation of a preferred polyacrylonitrile, having an average molecular weight between 62,000 and 67,000, for the preparation of yarns from solutions of the polymer in dimethyl formamide by dry-spinning techniques. As seen in Example VII, the process is equally applicable for the consistent preparation of an acrylonitrile polymer having an average molecular weight in the vicinity of 120,000 to 130,000. Such a polymer is preferred for the preparation of yarns by wet-spinning techniques. Polyacrylonitrile yarns have highly desirable tensile and elongation properties and are especially well-known for their resistance to weathering and common organic solvents, such as used in dry cleaning.

The process is preferably operated on a continuous basis because the polymers so prepared are most uniform and the process is most economical. Troublesome chain branching is avoided since this usually occurs in the late stages of polymerization and the process of this invention polymer formed is continually removed and doesn't reach this stage. In addition, the polymer product precipitates readily from the reaction mixture in finely divided form suitable for the preparation of solutions in the volatile organic solvents described in U. S. 2,404,714 to U. S. 2,404,727, inclusive. Further, the products produced by the process of this invention can be used directly in wet- or dry-spinning or casting techniques without the use of intermediate costly steps, such as blending or the extraction of polymeric aggregates of unsuitable molecular weight.

The polymers of this invention may be used in the following ways, among others:

Outdoor Uses:
  Auto tops
  Balloon fabric
  Belts for combines
  Fire hose covers
  Horse harness
  Harvester aprons
  Lawn mower baskets
  Life belts and preservers
  Mosquito netting
  Rainwear
  Outdoor sewing thread
  Sporting equipment
  Hammocks
  Sea bags Staple:
  Blankets
  Papermakers felt
  "Felt base" linoleum Flat fabrics:
  Crepe fabrics
  Airplane head rest
  Diaphragms
  Lamination
  Leader cloths
  RR canvas
  Shower curtains
  Tracing cloth
  Varnished thread
  Varnished silk
  Curtains
  Shades
  Ventubes (mining)
  Lampshades
  Bookbinding
  Cloth top sport shoes
  Camera bellows
  Sacking
  Tapestry
  Mattress covers Miscellaneous:
  Laundry net
  Braided thread
  Cable braid
  Tablecloths Tapes:
  Zipper
  Electrical
  Venetian blind tapes
  Watch straps Rubber covered:
  Coated diaphragms
  Conveyor belt Any departure from the above description which conforms to the present invention is intended to be included within the scope of the claims.

I claim:
1. A process for the polymerization of acrylonitrile to a polymer having a uniform molecular weight which comprises forming an aqueous solution of acrylonitrile; dissolving therein a perdisulfate catalyst and an activator comprising a water-soluble sulfoxy reducing agent which has a sulfur atom having a valence not exceeding 4; adjusting the pH of the resultant solution between 2.5 and 3.5; polymerizing the said acrylonitrile dissolved in said solution; maintaining the acidity of the said solution during polymerization at a substantially constant pH value between 2.5 and 3.5 by adding acid during polymerization; and continually removing the polymer as it forms during polymerization.

2. A process in accordance with claim 1 wherein the said polymerization is carried out at a temperature of from 20° C. to 75° C.

3. A process in accordance with claim 1 wherein the said catalyst is present in amounts from 0.3% to 0.75% and the said activator is present in amounts from 0.6% to 1.5%.

4. A process in accordance with claim 1 wherein said polymerization is carried out at a temperature of 45° C.

5. A process for the polymerization of acrylonitrile to a polymer having a uniform molecular weight which comprises adding the said acrylonitrile to an aqueous solution contained in an aluminum vessel, the said solution having dissolved therein a perdisulfate catalyst and an activator comprising a water-soluble sulfoxy reducing agent which has a sulfur atom having a valence not exceeding 4; adjusting the acidity of the resultant solution to a pH value of between 2.5 and 3.5; polymerizing the said acrylonitrile in the resultant solution; adding acid during polymerization to maintain the pH at a substantially constant value between 2.5 and 3.5; and removing said polymer from the said vessel as it is formed during polymerization.

6. A process for the polymerization of acrylonitrile to a polymer having a uniform molecular weight which comprises dissolving the said acrylonitrile in an aqueous solution which has dissolved therein 0.3% to 0.75% of ammonium perdisulfate and 0.6% to 1.5% sodium metabisulfite; adjusting the pH value of the resultant solution to between 2.5 and 3.5; polymerizing the said acrylonitrile in the resultant solution at a temperature of from 20° C. to 75° C.; and maintaining the acidity of the said resultant solution during polymerization at a substantially constant pH value between 2.5 and 3.5 by adding acid during polymerization.

7. A process for the polymerization of acrylonitrile to a polymer having a uniform molecular weight which comprises dissolving the said acrylonitrile in an aqueous solution which has dissolved therein from 0.3% to 0.75% of ammonium perdisulfate and from 0.6% to 1.5% sodium metabisulfite; adjusting the pH value between 2.5 and 3.5; polymerizing the said acrylonitrile in the resultant solution at a temperature of 45° C.; and maintaining the acidity of the resultant solution during polymerization at a substantially constant pH value between 2.5 and 3.5 by adding sulfuric acid during polymerization.

JOHN CADWALLADER RICHARDS.

REFERENCES CITED

The following references are of record in the file of this patent:

UNITED STATES PATENTS

| Number | Name | Date |
|---|---|---|
| 2,434,054 | Roedel | Jan. 6, 1948 |
| 2,436,926 | Jacobson | Mar. 2, 1948 |
| 2,462,354 | Brubaker | Feb. 22, 1949 |
| 2,475,016 | de Nie | July 5, 1949 |
| 2,486,241 | Arnold | Oct. 25, 1949 |
| 2,496,384 | de Nie | Feb. 7, 1950 |

OTHER REFERENCES

Bacon, article in Trans. Faraday Soc., vol. 42, pages 140–155 (1946).

Morgan, article in Trans. Faraday Soc., vol. 42, pages 169–183 (1946).